(12) United States Patent
Song

(10) Patent No.: US 7,206,049 B2
(45) Date of Patent: Apr. 17, 2007

(54) LIQUID CRYSTAL DISPLAY AND THIN FILM TRANSISTOR ARRAY PANEL THEREFOR

(75) Inventor: Jang-Kun Song, Seoul (KR)

(73) Assignee: Samsung Electronics Co., Ltd., Suwon, Kyunggi-Do (KR)

( * ) Notice: Subject to any disclaimer, the term of this patent is extended or adjusted under 35 U.S.C. 154(b) by 501 days.

(21) Appl. No.: 10/656,065

(22) Filed: Sep. 5, 2003

(65) Prior Publication Data

US 2004/0056987 A1    Mar. 25, 2004

(30) Foreign Application Priority Data

Sep. 6, 2002    (KR) ................. 10-2002-0053803

(51) Int. Cl.
*G02F 1/1343* (2006.01)

(52) U.S. Cl. ..................................... 349/141
(58) Field of Classification Search .............. 349/141, 349/139

See application file for complete search history.

(56) References Cited

U.S. PATENT DOCUMENTS

| | | | |
|---|---|---|---|
| 6,256,081 B1 * | 7/2001 | Lee et al. ............. | 349/141 |
| 6,512,565 B1 * | 1/2003 | Lee et al. ............. | 349/130 |
| 6,603,526 B2 * | 8/2003 | Kim et al. ............. | 349/141 |
| 6,646,707 B2 * | 11/2003 | Noh et al. ............. | 349/141 |

* cited by examiner

*Primary Examiner*—Toan Ton
(74) *Attorney, Agent, or Firm*—MacPherson Kwok Chen & Heid LLP

(57) ABSTRACT

A thin film transistor array panel is provided, which includes: a gate line and a data line formed on an insulating substrate and intersecting each other; a plurality of common electrodes separated from the gate line and the data line and making an angle of about 7–23 degrees with the gate line; a plurality of pixel electrodes separated from the gate line, the data line, and the common electrodes, extending parallel to the common electrodes, and alternately arranged with the common electrodes; and a thin film transistor connected to the gate line, the data line, and the pixel electrodes, wherein the distance between the common electrode and the pixel electrode is greater than the respective width of the common electrode and the pixel electrode.

17 Claims, 8 Drawing Sheets

LIQUID CRYSTAL DISPLAY AND THIN FILM TRANSISTOR ARRAY PANEL THEREFOR

BACKGROUND OF THE INVENTION (a) Field of the Invention

The present invention relates to a liquid crystal display and a thin film transistor array panel.

(b) Description of the Related Art

A liquid crystal display (LCD) is one of the most widely used flat panel displays. An LCD includes two panels provided with field-generating electrodes and a liquid crystal (LC) layer interposed therebetween. The LCD displays images by applying voltages to the field-generating electrodes to generate an electric field in the LC layer, which determines orientations of LC molecules in the LC layer to adjust polarization of incident light.

Among LCDs including field-generating electrodes on respective panels, a kind of LCDs called in-plane switching (IPS) mode LCD provides a plurality of pixel electrodes and a plurality of common electrode at one panel. The pixel electrodes and the common electrodes are alternately arranged and generate an electric field substantially parallel to surface of the panels. The IPS LCD is known to have superior viewing angle to a twisted-nematic (TN) mode LCD.

The image display of the LCD is accomplished by applying individual voltages to the respective pixel electrodes. For the application of the individual voltages, a plurality of three-terminal thin film transistors (TFTs) are connected to the respective pixel electrodes, and a plurality of gate lines transmitting signals for controlling the TFTs and a plurality of data lines transmitting voltages to be applied to the pixel electrodes are provided on the panel.

Since the IPS mode LCD has disadvantages of lateral color shifts and gray inversion in a direction, LCDs having curved pixel electrodes and curved common electrodes as shown in FIGS. 10A and 10B are suggested. However, the LCD shown in FIG. 10A has a disadvantage of increased resistance and parasitic capacitance of data lines, and the LCD shown in FIG. 10B has a disadvantage of reduced aperture ratio due to increased common electrodes.

SUMMARY OF THE INVENTION

A motivation of the present invention is to solve the problems of the conventional art.

A thin film transistor array panel is provided, which includes: a gate line and a data line formed on an insulating substrate and intersecting each other; a plurality of common electrodes separated from the gate line and the data line and making an angle of about 7–23 degrees with the gate line; a plurality of pixel electrodes separated from the gate line, the data line, and the common electrodes, extending parallel to the common electrodes, and alternately arranged with the common electrodes; and a thin film transistor connected to the gate line, the data line, and the pixel electrodes.

The common electrodes preferably include first and second electrodes making an angle of about 15–45 degrees.

The thin film transistor array panel may further include a connecting electrode connecting the common electrodes and a common electrode line extending parallel to the gate line and connected to the connecting electrode.

The thin film transistor array panel may further include a pixel electrode line connecting the pixel electrodes and extending parallel to the data lines.

A thin film transistor array panel is provided, which includes: an insulating substrate; a gate line formed on the insulating substrate; a common electrode line including a plurality of branched common electrodes making an angle of about 7–23 degrees with the gate line; a gate insulating layer on the gate line; a semiconductor layer on the gate insulating layer; a data line formed at least in part on the semiconductor layer; a pixel electrode line formed at least in part on the semiconductor layer and including a plurality of branched pixel electrodes alternately arranged with the common electrodes; and a passivation layer formed on the data line and the pixel electrode line.

The common electrodes preferably include first and second electrodes making an angle of about 15–45 degrees with each other.

The pixel electrodes preferably include third and fourth electrodes extending parallel to the first and the second electrodes, respectively.

The thin film transistor array panel may further include a redundant data line formed on the passivation layer and extending along the data line, and the passivation layer preferably has a contact hole for connection between the data line and the redundant data line.

The thin film transistor array panel may further include a contact assistant formed on the passivation layer, and the passivation layer preferably has a contact hole exposing a portion of the data line and covered by the contact assistant.

Preferably, the common electrode line extends substantially parallel to the gate line and further includes a frame connecting the common electrodes.

The pixel electrode line preferably extends substantially parallel to the data line.

The thin film transistor array panel may further include an ohmic contact disposed between the semiconductor layer and the data line and the pixel electrode line.

The semiconductor layer may have substantially the same planar shape as the data line and the pixel electrode line and the ohmic contact.

A liquid crystal display is provided, which includes: a first substrate; a gate line and a data line formed on the first substrate and intersecting each other; a plurality of common electrodes separated from the gate line and the data line and making an angle of about 7–23 degrees with the gate line; a plurality of pixel electrodes separated from the gate line, the data line, and the common electrodes, extending parallel to the common electrodes, and alternately arranged with the common electrodes; a thin film transistor connected to the gate line, the data line, and the pixel electrodes; a second substrate; and a liquid crystal layer interposed between the first substrate and the second substrate.

BRIEF DESCRIPTION OF THE DRAWINGS

The above and other advantages of the present invention will become more apparent by describing preferred embodiments thereof in detail with reference to the accompanying drawings in which.

DETAILED DESCRIPTION OF PREFERRED EMBODIMENTS

Figure 1:
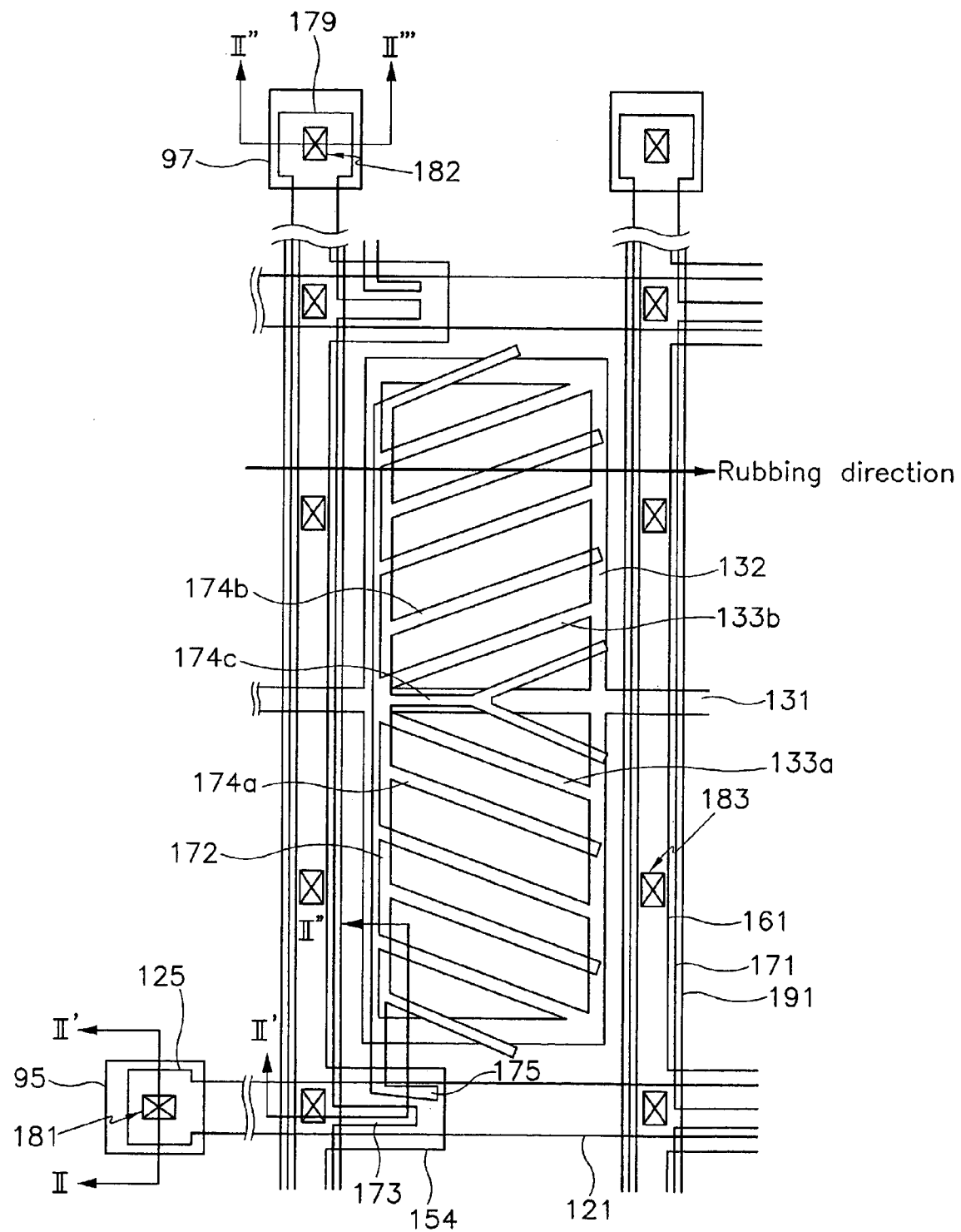
FIG. 1 is a layout view of an exemplary TFT array panel for an LCD according to an embodiment of the present invention.

The present invention now will be described more fully hereinafter with reference to the accompanying drawings, in which preferred embodiments of the invention are shown. The present invention may, however, be embodied in many different forms and should not be construed as limited to the embodiments set forth herein.

In the drawings, the thickness of layers, films and regions are exaggerated for clarity. Like numerals refer to like elements throughout. It will be understood that when an element such as a layer, film, region or substrate is referred to as being "on" another element, it can be directly on the other element or intervening elements may also be present. In contrast, when an element is referred to as being "directly on" another element, there are no intervening elements present.

Now, liquid crystal displays, TFT array panels for LCDs, and manufacturing methods thereof according to embodiments of the present invention will be described with reference to the accompanying drawings.

Figure 2:
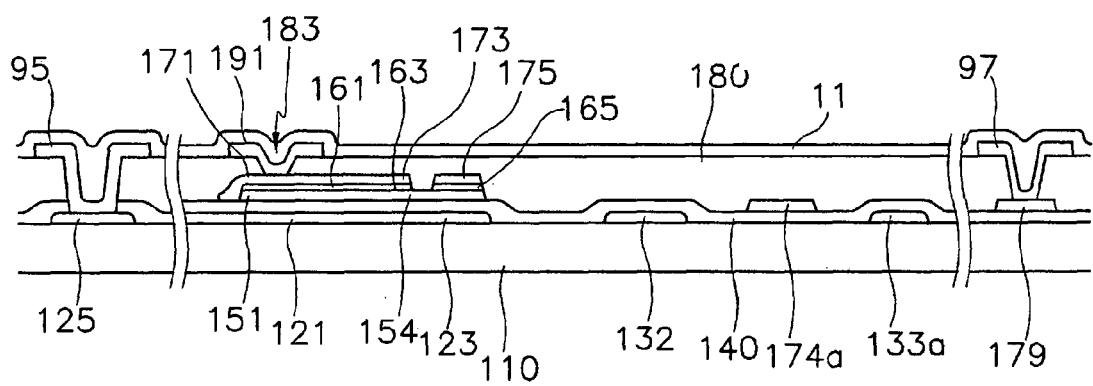
FIG. 2 is a sectional view of the TFT array panel shown in FIG. 1 taken along the line II—II'.

FIG. 1 is a layout view of an exemplary TFT array panel for an LCD according to an embodiment of the present invention, and FIG. 2 is a sectional view of the TFT array panel shown in FIG. 1 taken along the line II—II'.

A plurality of gate lines 121 for transmitting gate signals and a plurality of common electrode lines 131 for transmitting a common voltage are formed on an insulating substrate 110.

Each gate line 121 extends substantially in a transverse direction and a plurality of portions of each gate line 121 form a plurality of gate electrodes 123.

Each common electrode line 131 extends substantially in the transverse direction and includes a plurality of sets of branches, and each set of branches include a frame 132 and a plurality of common electrodes 133a and 133b connected to the frame 132. The frame 132 has a rectangular shape including four edges. The common electrodes 133a and 133b obliquely extend and the common electrodes 133a extend from a left edge of the frame 132 in an upper right direction while the common electrodes 133b extend from the left edge of the frame 132 in a lower right direction. The extensions of the common electrodes 133a and 133b meet the gate lines 121 at an angle of about 15±8 degrees, i.e., in a range of about 7 to 23 degrees and thus they meet each other at an angle in a range of about 14 to 46 degrees, preferably in a range of about 15 to 45 degrees.

The gate lines 121 and the common electrode lines 131 may include two films having different physical characteristics, a lower film (not shown) and an upper film (not shown). The upper film is preferably made of low resistivity metal including Al containing metal such as Al and Al alloy for reducing signal delay or voltage drop in the gate lines 121 and the common electrode lines 131. On the other hand, the lower film is preferably made of material such as Cr, Mo and Mo alloy, which has good contact characteristics with other materials such as indium tin oxide (ITO) or indium zinc oxide (IZO). A good exemplary combination of the lower film material and the upper film material is Cr and Al—Nd alloy.

In addition, the lateral sides of the gate lines 121 and the common electrode lines 131 are tapered, and the inclination angle of the lateral sides with respect to a surface of the substrate 110 ranges about 30–80 degrees.

A gate insulating layer 140 preferably made of silicon nitride (SiNx) is formed on the gate lines 121 and the common electrode lines 131.

A plurality of semiconductor stripes 151 preferably made of hydrogenated amorphous silicon (abbreviated to "a-Si") or polysilicon are formed on the gate insulating layer 140. Each semiconductor stripe 151 extends substantially in a longitudinal direction and has a plurality of projections 154 branched out toward the gate electrodes 123.

A plurality of ohmic contact stripes and islands 161 and 165 preferably made of silicide or n+ hydrogenated a-Si heavily doped with n type impurity are formed on the semiconductor stripes 151. Each ohmic contact stripe 161 has a plurality of projections 163, and the projections 163 and the ohmic contact islands 165 are located in pairs on the projections 154 of the semiconductor stripes 151.

The lateral sides of the semiconductor stripes 151 and the ohmic contacts 161 and 165 are tapered, and the inclination angles thereof are preferably in a range between about 30–80 degrees.

A plurality of data lines 171 and a plurality of pixel electrode lines 172 separated from each other are formed on the ohmic contacts 161 and 165 and the gate insulating layer 140.

The data lines 171 for transmitting data voltages extend substantially in the longitudinal direction and intersect the gate lines 121 and the common electrode lines 131. Each pixel electrode lines 172 extend substantially in the longitudinal direction and includes a plurality of branches 174a–174c called pixel electrodes. The pixel electrodes 174a and 174b extend parallel to the common electrodes 133a and 133b respectively, and the pixel electrode 174c extends along the common electrode line 131 and is bifurcated into two branches parallel to the common electrodes 133a and 133b, respectively. Further, as shown in FIGS. 1–4, the distance between the common electrode (133a, 133b) and an adjacent pixel electrode (174a, 174b) is greater than the respective width of the common electrode and the adjacent pixel electrode. More particularly, the distance between common electrode 133a and the adjacent pixel electrode 174a is greater than the width of either the common electrode 133a or the pixel electrode 174a.

Each data line 171 includes a plurality of branches of each data line 171 projecting toward the gate lines 123 to form a plurality of source electrodes 173, and each pixel electrode line 172 further includes an extension 175 projecting toward the source electrode 173 forming a drain electrode 175. Each pair of the source electrodes 173 and the drain electrodes 175 are opposite each other with respect to a gate electrode 123. A gate electrode 123, a source electrode 173, and a drain electrode 175 along with a projection 154 of a semiconductor stripe 151 form a TFT having a channel formed in the projection 154 disposed between the source electrode 173 and the drain electrode 175.

The pixel electrodes 174a–174c receive the data voltages from the drain electrodes 175 and generate electric fields in cooperation with the common electrodes 133a and 133b, which reorient liquid crystal molecules in the liquid crystal layer disposed therebetween. The pixel electrodes 174a–174c and the common electrodes 133a and 133b form a liquid crystal capacitor, which stores applied voltages after turn-off of the TFT. An additional capacitor called a "storage capacitor," which is connected in parallel to the liquid crystal capacitor, is provided for enhancing the voltage storing capacity. The storage capacitors are implemented by overlapping the pixel electrode lines 172 with the frames 132 of the common electrode lines 131.

The data lines 171 and the pixel electrode lines 172 may also include a lower film (not shown) preferably made of Mo, Mo alloy or Cr and an upper film (not shown) located thereon and preferably made of Al containing metal.

Like the gate lines 121 and the common electrode lines 131, the data lines 171 and the pixel electrode lines 172 have tapered lateral sides, and the inclination angles thereof range about 30–80 degrees.

The ohmic contacts 161 and 165 are interposed only between the underlying semiconductor stripes 151 and the overlying data lines 171 and the overlying drain electrodes 175 thereon and reduce the contact resistance therebetween. The semiconductor stripes 151 include a plurality of exposed portions, which are not covered with the data lines 171 and the drain electrodes 175, such as portions located between the source electrodes 173 and the drain electrodes 175. Although the semiconductor stripes 151 are narrower than the data lines 171 at most places, the width of the semiconductor stripes 151 becomes large near the gate lines 121 as described above, to enhance the insulation between the gate lines 121 and the data lines 171.

A passivation layer 180 is formed on the data lines 171 and the pixel electrode lines 172, and the exposed portions of the semiconductor stripes 151. The passivation layer 180 is preferably made of photosensitive organic material having a good flatness characteristic, low dielectric insulating material such as a-Si:C:O and a-Si:O:F formed by plasma enhanced chemical vapor deposition (PECVD), or inorganic material such as silicon nitride.

The passivation layer 180 has a plurality of contact holes 182 and 183 exposing end portions 179 of the data lines 171 and mid-portions of the data lines 171, respectively. The passivation layer 180 and the gate insulating layer 140 have a plurality of contact holes 181 exposing end portions 125 of the gate lines 121. The contact holes 181–183 can have various shapes such as polygon or circle. The area of each contact hole 181 or 182 is preferably equal to or larger than 0.5 mm×15 μm and not larger than 2 mm×60 μm.

A plurality of redundant data lines 191 and a plurality of contact assistants 95 and 97, which are preferably made of ITO, IZO or Cr, are formed on the passivation layer 180.

The redundant data lines 191 are connected to the data lines 171 through the contact holes 183 to form compensatory signal paths of the data voltages. The contact assistants 95 and 97 are connected to the exposed end portions 125 of the gate lines 121 and the exposed end portions 179 of the data lines 171 through the contact holes 181 and 182, respectively. The contact assistants 95 and 97 are not requisites but preferred to protect the exposed portions 125 and 179 and to complement the adhesiveness of the exposed portion 125 and 179 and external devices.

Finally, an alignment layer 11 is formed on the redundant data lines 191, the contact assistants 95 and 97, and the passivation layer 180. The alignment layer 11 is rubbed in a direction indicated by an arrow as shown in FIG. 1, which is substantially parallel to the gate lines 121.

An LCD according to an embodiment includes the TFT array panel shown in FIGS. 1 and 2, a color filter array panel (not shown) provided with a plurality of color filters and an alignment layer coated on the color filters and rubbed in the direction indicated by the arrow shown in FIG. 1, and a liquid crystal layer (not shown) interposed therebetween. Liquid crystal molecules in the liquid crystal layer are aligned such that their long axes are parallel to surfaces of the panels and the rubbing direction. The liquid crystal layer has a positive dielectric anisotropy.

Upon application of the common voltage and the data voltage to the common electrodes 133a and 133b and the pixel electrodes 174a–174c, an electric field substantially parallel to the surfaces of the panels and substantially perpendicular to the extension direction of the common electrodes 133a and 133b and the pixel electrodes 174a–174c is generated. The liquid crystal molecules tend to change their orientations in response to the electric field such that their long axes are parallel to the field direction.

Figure 10A:
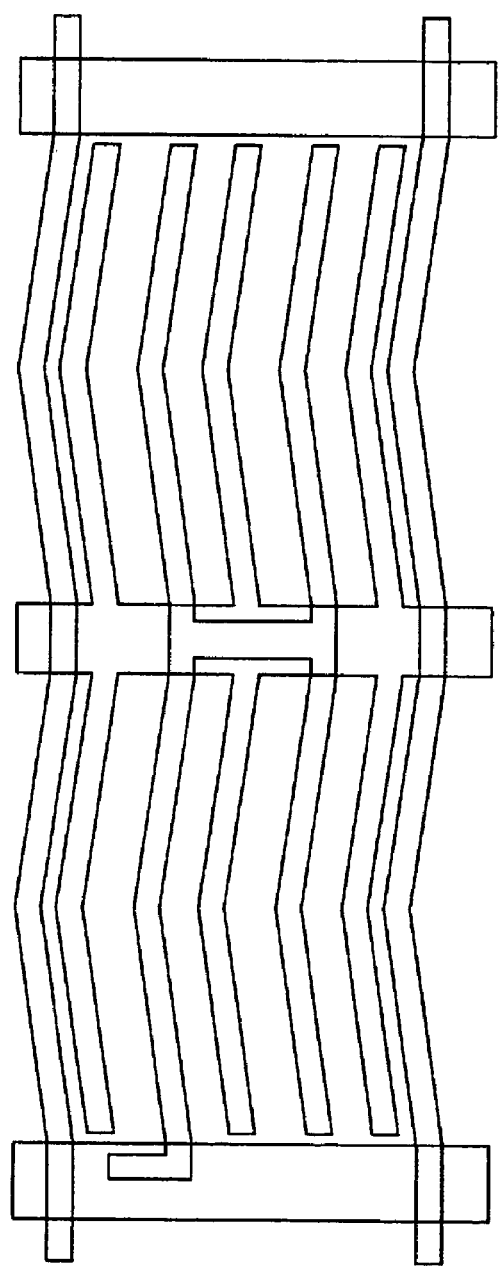
FIGS. 10A and 10B are layout views of TFT array panels for conventional LCDs.
Figure 10B:
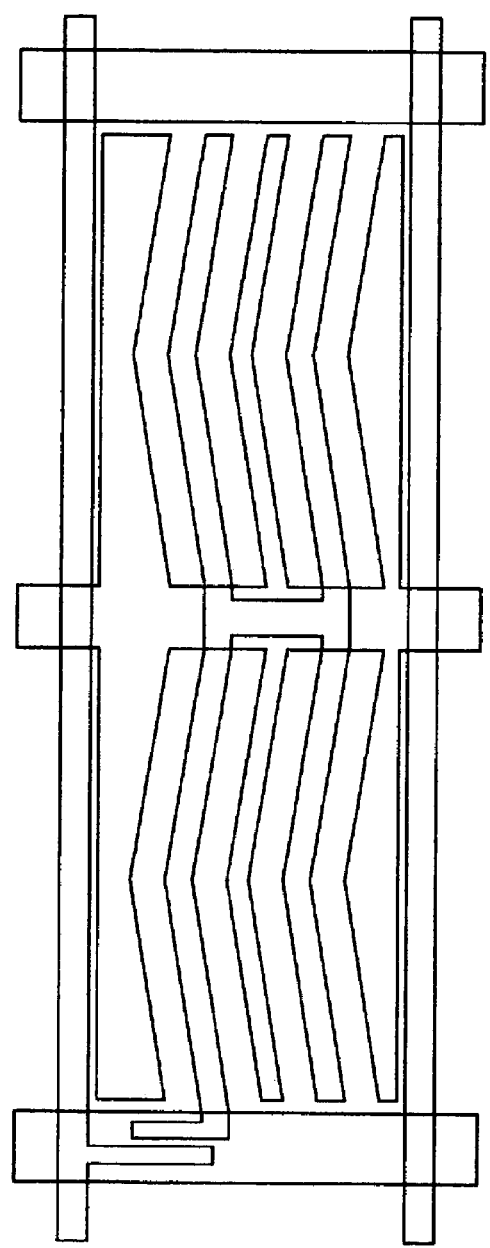

An LCD including the TFT array panel shown in FIGS. 1 and 2 is compared with conventional LCDs shown in FIGS. 10A and 10B, which are layout views of conventions LCDs.

| | | conventional LCD | | |
|---|---|---|---|---|
| | | FIG. 10A | FIG. 10B | FIG. 1 |
| 1 | meeting angle between electrodes | about 150° | about 150° | about 30° |
| 2 | rubbing direction | parallel to data line | parallel to data line | parallel to gate line (advantageous for preventing lateral crosstalk) |
| 3 | shape of pixel area | zigzag | rectangle | rectangle (advantageous for reducing signal delay in data line) |
| 4 | number of disclination lines | 3 or 5 | 3 or 5 | 1 (advantageous for increasing luminance) |
| 5 | decrease of aperture ratio due to common electrode | none | some | none (advantageous for improving aperture ratio) |
| 6 | facility of varying distance between electrodes | difficult | difficult | easy |

The initial orientations of the liquid crystal molecules shown in FIG. 1 are parallel to the gate lines, i.e., perpendicular to the data lines, while those shown in FIGS. 10A and 10B are parallel to the data lines. Meanwhile, the voltage difference between the data lines and the pixel electrode lines form electric fields perpendicular to the data lines, which interfere electric fields between the common electrodes and the pixel electrodes shown in FIGS. 10A and 10B, thereby causing lateral crosstalk. However, since the electric field between the data lines and the pixel electrode lines has the same field direction as the electric field between the common electrodes and the pixel electrodes in the LCD shown in FIGS. 1 and 2, there is no lateral crosstalk.

The rectangular shape of pixel areas allows rectilinear data lines, which have smaller resistance and parasitic capacitances than the data lines shown in FIG. 10A. Therefore, the rectangular shape of the pixel areas is advantageous for reducing the signal delay in the data lines.

The disclination lines are generated near the areas where the orientations of the liquid crystal molecules vary. The molecular orientations shown in FIG. 1 vary only near the pixel electrode 174c, while those shown in FIGS. 10A and 10B vary near the three curves of the pixel electrodes. Accordingly, the number of the disclination lines shown in FIG. 1 is very small compared with those shown in FIGS. 10A and 10B.

The LCD shown in FIG. 10B includes a pair of wide common electrodes near the data lines for making rectangular pixel areas, which reduces the aperture ratio. However, there is no such problem in the LCD shown in FIGS. 1 and 2.

The pixel electrodes and the common electrodes shown in FIGS. 10A and 10B extend parallel to the data lines rather than the gate lines, while those shown in FIGS. 1 and 2 extend parallel to the gate lines rather than the data lines. Since the distance between the gate lines is much larger than the distance between the data lines, the variation of the number of the electrodes and the distance between the electrodes in the LCD shown in FIG. 1 is very easy compared with that shown in FIGS. 10A and 10B.

A method of manufacturing the TFT array panel shown in FIGS. 1 and 2 according to an embodiment of the present invention will be now described in detail.

A plurality of gate lines 121 including a plurality of gate electrodes 123 and a plurality of common electrode lines 131 including a plurality of common electrodes 133a and 133b are formed on an insulating substrate 110 such as transparent glass.

When the gate lines 121 and the common electrode lines 131 have a double-layered structure including a lower conductive film and an upper conductive film, the lower conductive film is preferably made of material such as Mo or Cr alloy having good physical and chemical characteristics and the upper conductive film is preferably made of Al or Al containing metal.

The lower film of Mo alloy and the upper film of Ag alloy can be simultaneously patterned by wet etching preferably using an Ag etchant containing phosphoric acid, nitric acid, acetic acid, and pure water. Since the etching ratio for Ag alloy is larger than that for Mo alloy, a taper angle of about 30 degrees can be obtained.

After sequential deposition of a gate insulating layer 140, an intrinsic a-Si layer, and an extrinsic a-Si layer, the extrinsic a-Si layer and the intrinsic a-Si layer are photo-etched to form a plurality of extrinsic semiconductor stripes 164 and a plurality of intrinsic semiconductor stripes 151 including a plurality of projections 154 on the gate insulating layer 140.

Subsequently, a plurality of data lines 171 including a plurality of source electrodes 173 and a plurality of pixel electrode lines 172 including a plurality of drain electrodes 175 and a plurality of pixel electrodes 174a–174c are formed.

Thereafter, portions of the extrinsic semiconductor stripes 164, which are not covered with the data lines 171 and the pixel electrode lines 172, are removed to complete a plurality of ohmic contact stripes 161 including a plurality of projections 163 and a plurality of ohmic contact islands 165 and to expose portions of the intrinsic semiconductor stripes 151. Oxygen plasma treatment preferably follows thereafter in order to stabilize the exposed surfaces of the semiconductor stripes 151.

A passivation layer 180 is formed by growing a-Si:C:O or a-Si:O:F, by CVD of inorganic material such as silicon nitride, or by coating an organic insulating material such as acryl-based material. When forming an a-Si:C:O layer, $SiH(CH_3)_3$, $SiO_2(CH_3)_4$, $(SiH)_4O_4(CH_3)_4$, $Si(C_2H_5O)_4$ or the like used as basic source, oxidant such as $N_2O$ or $O_2$, and Ar or He are mixed in gaseous states to flow for the deposition. For an s-Si:O:F layer, the deposition is performed by flowing a gas mixture including $SiH_4$, $SiF_4$ or the like and an additional gas of $O_2$. $CF_4$ may be added as a secondary source of fluorine.

After depositing a passivation layer 180, the passivation layer 180 and the gate insulating layer 140 are patterned to form a plurality of contact holes 181, 182 and 183 exposing end portions 125 of the gate lines 121, end portions 179 of the data lines 171, and mid-portions of the data lines 171, respectively.

Finally, a plurality of redundant data lines 191 and a plurality of contact assistants 95 and 97 are formed on the passivation layer 180 by sputtering and photo-etching IZO, ITO or Cr layer.

An example of sputtering target for the IZO layer is IDIXO (indium x-metal oxide) produced by Idemitsu Co. of Japan. The sputtering target includes $In_2O_3$ and ZnO, and the ratio of Zn with respect to the sum of Zn and In is preferably in a range of about 15–20 atomic %. The preferred sputtering temperature for minimizing the contact resistance is equal to or lower than about 250° C. The etching of the IZO or ITO layer preferably includes wet etching using a Cr etchant of $HNO_3/(NH_4)_2Ce(NO_3)_6/H_2O$, which does not erode Al of the data lines 171, the drain electrodes 175, the gate lines 121, the storage electrode lines 131, and the storage electrodes 133a–133e. Nitrogen gas, which prevents the formation of metal oxides on the exposed portions of the gate lines 121 and the data lines 171 through the contact holes 181–183, is preferably used for the pre-heating process before the deposition of the ITO layer, the IZO layer, or the Cr layer.

A TFT array panel for an LCD according to another embodiment of the present invention will be described in detail with reference to FIGS. 3 and 4.

Figure 3:
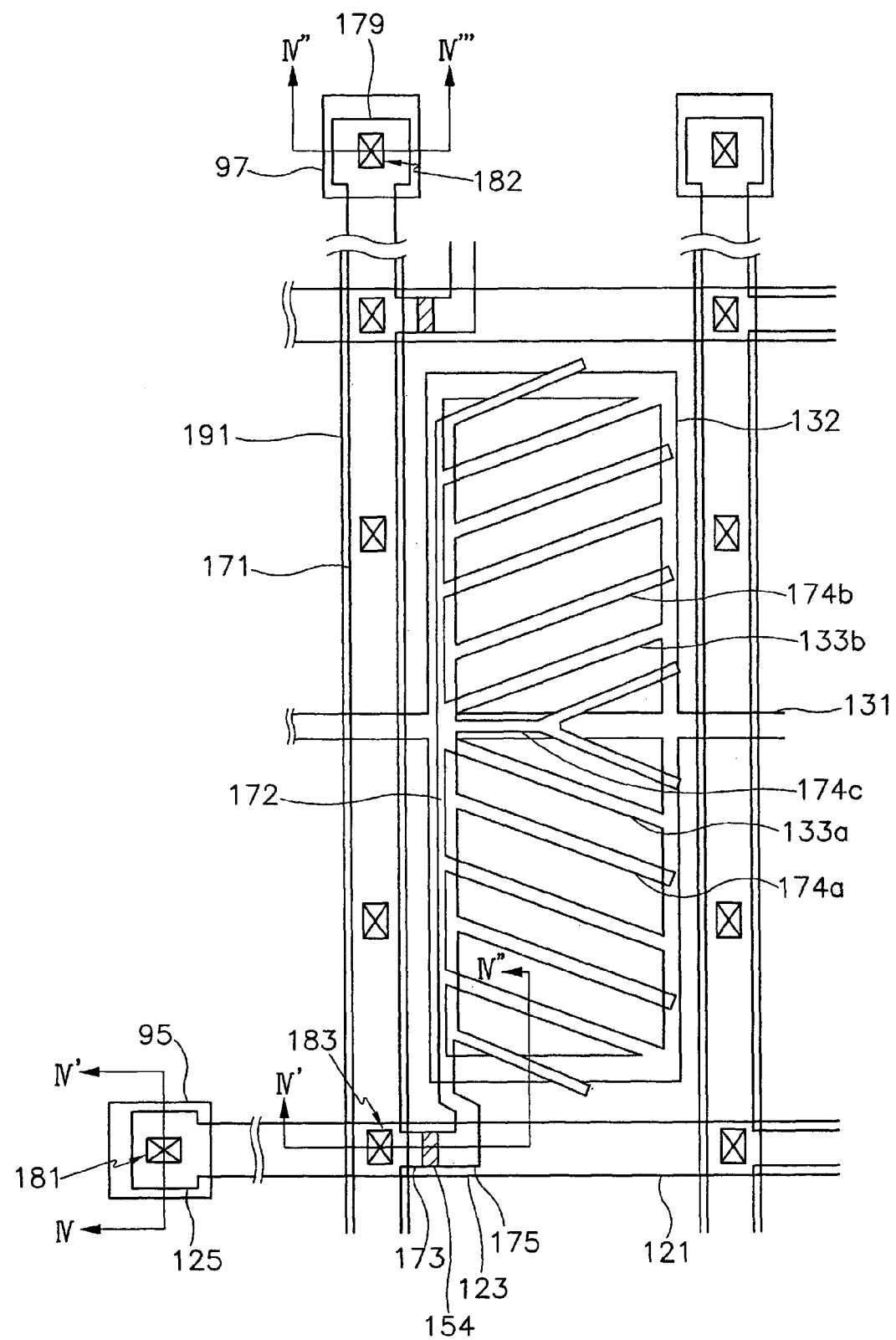
FIG. 3 is a layout view of an exemplary TFT array panel for an LCD according to another embodiment of the present invention.
Figure 4:
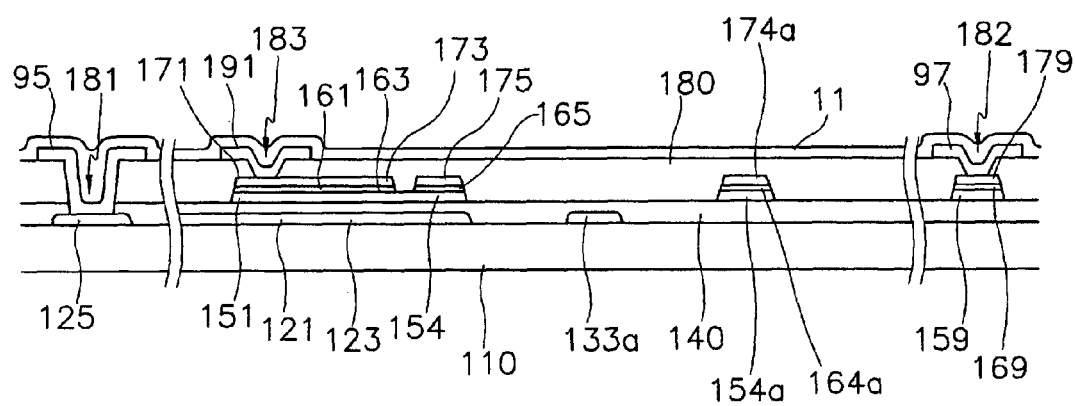
FIG. 4 is a sectional view of the TFT array panel shown in FIG. 3 taken along the lines IV–VI', IV'–IV" and IV"–IV'''.

FIG. 3 is a layout view of an exemplary TFT array panel for an LCD according to another embodiment of the present invention, and FIG. 4 is a sectional view of the TFT array panel shown in FIG. 3 taken along the lines IV–VI', IV'–IV" and IV"–IV'".

As shown in FIGS. 3 and 4, a layered structure of a TFT array panel of an LCD according to this embodiment is almost the same as that shown in FIGS. 1 and 2. That is, a plurality of gate lines 121 including a plurality of gate electrodes 123 and a plurality of common electrodes lines 131 including a plurality of common electrodes 133a and 133b are formed on a substrate 110, and a gate insulating layer 140, a plurality of semiconductor stripes 151 including a plurality of projections 154, and a plurality of ohmic contact stripes 161 including a plurality of projections 163 and a plurality of ohmic contact islands 165 are sequentially formed thereon. A plurality of data lines 171 including a plurality of source electrodes 173 and a plurality of pixel electrode lines 172 including a plurality of drain electrodes 175 and a plurality of pixel electrodes 174a–174c are formed on the ohmic contacts 161 and 165, and a passivation layer 180 is formed thereon. A plurality of contact holes 181, 182 and 183 are provided at the passivation layer 180 and/or the gate insulating layer 140, and a plurality of redundant data lines 191 and a plurality of contact assistants 95 and 97 are formed on the passivation layer 180.

Different from the TFT array panel shown in FIGS. 1 and 2, the TFT array panel according to this embodiment further extends the extensions 154 of the semiconductor stripes 151 and the ohmic contact islands 165 along the pixel electrode lines 172 and the pixel electrodes 174a–174c.

The semiconductor stripes and islands 151 have almost the same planar shapes as the data lines 171 and the pixel electrode lines 172 as well as the underlying ohmic contacts 161 and 165, except for portions of the projections 154 where TFTs are provided. The semiconductor stripes 151 include some exposed portions, which are not covered with the data lines 171 and the pixel electrode lines 172, such as portions located between the source electrodes 173 and the drain electrodes 175.

Now, a method of manufacturing the TFT array panel shown in FIGS. 3 and 4 according to an embodiment of the present invention will be described in detail with reference to FIGS. 5–9 as well as FIGS. 3 and 4.

FIG. 5–9 are sectional views of a TFT array panel shown in FIGS. 3 and 4 in intermediate steps of a manufacturing method thereof according to an embodiment of the present invention.

Figure 5:
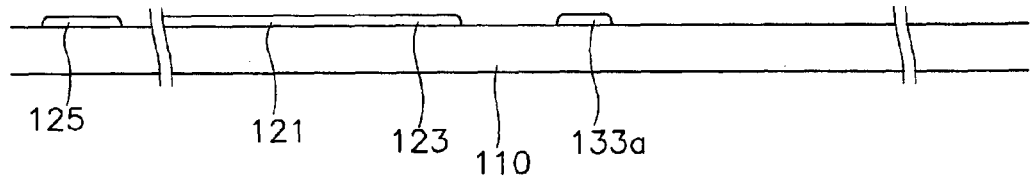
FIGS. 5–9 are sectional views of a TFT array panel shown in FIGS. 3 and 4 in intermediate steps of a manufacturing method thereof according to an embodiment of the present invention.

Referring to FIG. 5, a plurality of gate lines 121 including a plurality of gate electrodes 123 and a plurality of common electrode lines 131 including a plurality of common electrodes 133a and 133b are formed on a substrate 110 by photo etching.

Figure 6:
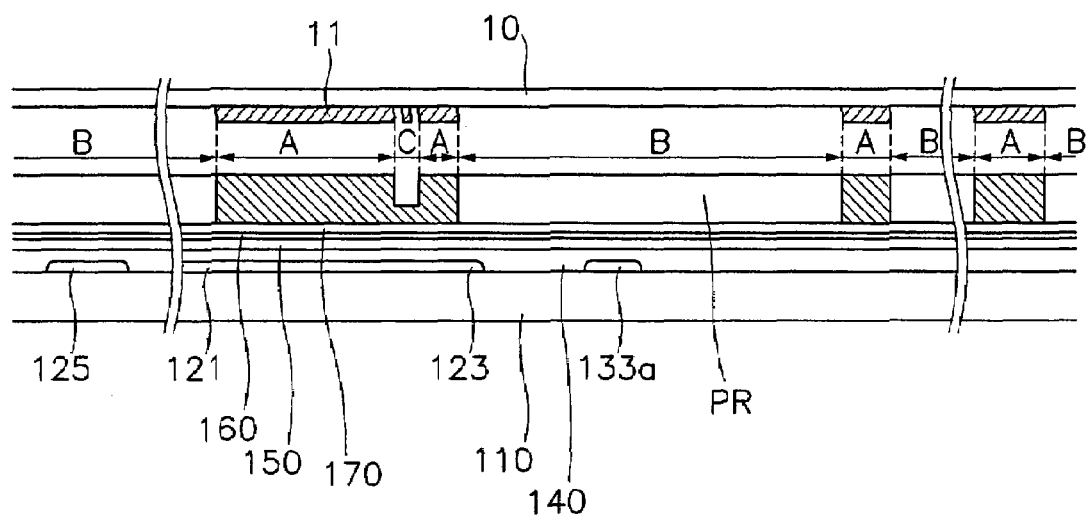

As shown in FIG. 6, a gate insulating layer 140, an intrinsic a-Si layer 150, and an extrinsic a-Si layer 160 are sequentially deposited by CVD such that the layers 140, 150 and 160 bear thickness of about 1,500–5,000 Å, about 500–2,000 Å and about 300–600 Å, respectively. A conductive layer 170 is deposited by sputtering, and a photoresist film with the thickness of about 1–2 microns is coated on the conductive layer 170.

The photoresist film is exposed to light through an exposure mask (not shown), and developed such that the developed photoresist PR has a position dependent thickness. The photoresist shown in FIG. 6 includes a plurality of first to third portions with decreased thickness. The first portions are located on wire areas A, the second portions are located on channel areas C, respectively, and the third portions having substantially zero thickness are located on remaining areas B, which expose underlying portions of the conductive layer 170. The thickness ratio of the second portions to the first portions of the photoresist PR is adjusted depending upon the process conditions in the subsequent process steps. It is preferable that the thickness of the second portions is equal to or less than half of the thickness of the first portions, and in particular, equal to or less than 4,000 Å.

The position-dependent thickness of the photoresist PR is obtained by several techniques, for example, by providing translucent areas on the exposure mask as well as transparent areas and light blocking opaque areas. The translucent areas may have a slit pattern, a lattice pattern, a thin film(s) with intermediate transmittance or intermediate thickness. When using a slit pattern, it is preferable that the width of the slits or the distance between the slits is smaller than the resolution of a light exposer used for the photolithography. Another example is to use reflowable photoresist. In detail, once a photoresist pattern made of a reflowable material is formed by using a normal exposure mask only with transparent areas and opaque areas, it is subject to reflow process to flow onto areas without the photoresist, thereby forming thin portions.

The different thickness of the photoresist PR enables to selectively etch the underlying layers when using suitable process conditions. Therefore, a plurality of data lines 171 including a plurality of source electrodes 173 and a plurality of pixel electrode lines 172 including a plurality of drain electrodes 175 and a plurality of pixel electrodes 174a–174c as well as a plurality of ohmic contact stripes 161 including a plurality of projections 163, a plurality of ohmic contact islands 165, and a plurality of semiconductor stripes 151 including a plurality of projections 154 are obtained by a series of etching steps.

For descriptive purpose, portions of the conductive layer 170, the extrinsic a-Si layer 160, and the intrinsic a-Si layer 150 on the wire areas A are called first portions, portions of the conductive layer 170, the extrinsic a-Si layer 160, and the intrinsic a-Si layer 150 on the channel areas C are called second portions, and portions of the conductive layer 170, the extrinsic a-Si layer 160, and the intrinsic a-Si layer 150 on the remaining areas B are called third portions.

An exemplary sequence of forming such a structure is as follows:

(1) Removal of third portions of the conductive layer 170, the extrinsic a-Si layer 160 and the intrinsic a-Si layer 150 on the wire areas A;

(2) Removal of the second portions of the photoresist PR;

(3) Removal of the second portions of the conductive layer 170 and the extrinsic a-Si layer 160 on the channel areas C; and (4) Removal of the first portions of the photoresist PR.

Another exemplary sequence is as follows:

(1) Removal of the third portions of the conductive layer 170;

(2) Removal of the second portions of the photoresist PR;

(3) Removal of the third portions of the extrinsic a-Si layer 160 and the intrinsic a-Si layer 150;

(4) Removal of the second portions of the conductive layer 170;

(5) Removal of the first portions of the photoresist PR; and (6) Removal of the second portions of the extrinsic a-Si layer 160.

The first example is described in detail.

Figure 7:
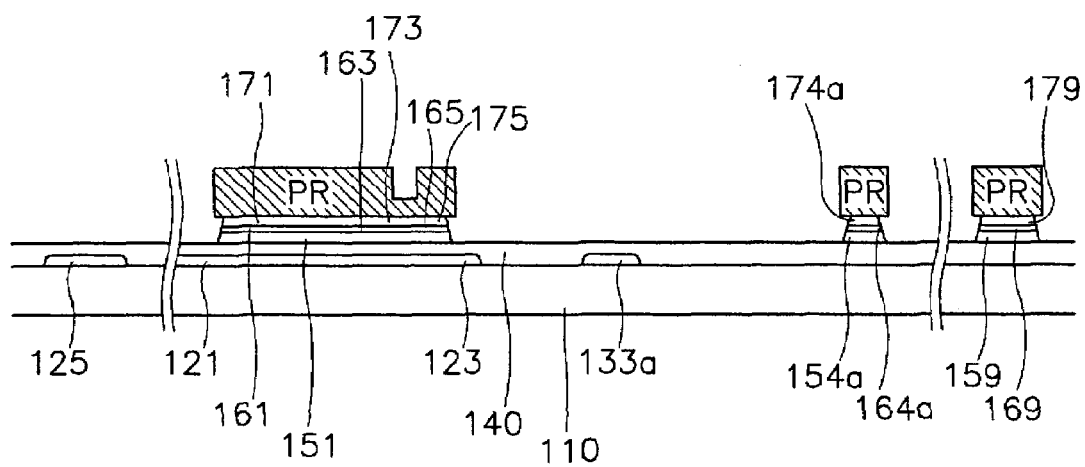

As shown in FIG. 7, the exposed third portions of the conductive layer 170 on the wire areas B are removed to expose the underlying third portions of the extrinsic a-Si layer 160.

FIG. 7 shows portions (referred to as conductors hereinafter) of the conductive layer 170 including the data lines 171 and the pixel electrode lines 172 connected to each other. The dry etching may etch out the top portions of the photoresist PR. Subsequently, the third portions of the extrinsic a-Si layer 160 on the areas B and of the intrinsic a-Si layer 150 are removed.

Figure 8:
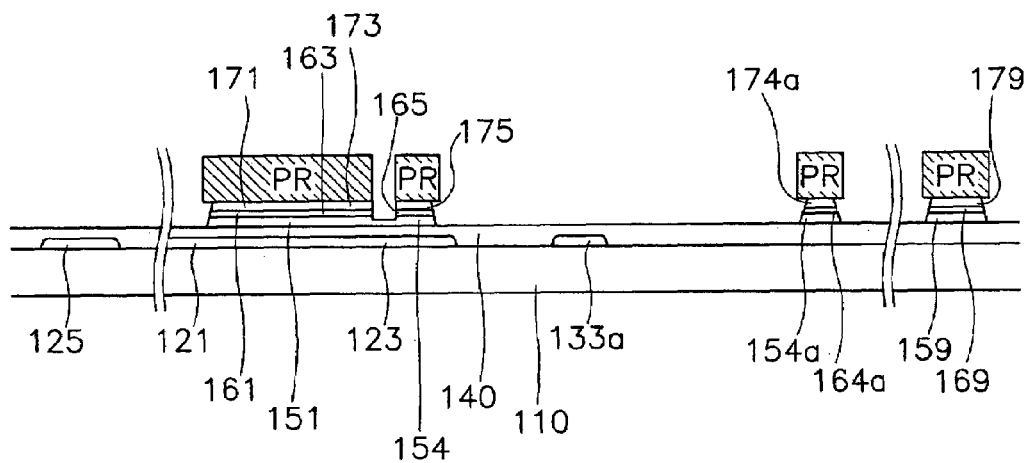

Referring to FIG. 8, the second portions of the photoresist PR are removed to expose the second portions of the conductors. The removal of the second portions of the photoresist PR are performed either simultaneously with or independent from the removal of the third portions of the extrinsic a-Si layer 160 and of the intrinsic a-Si layer 150. Residue of the second portions of the photoresist PR remained on the channel areas C is removed by ashing.

The semiconductor stripes 151 are completed in this step, and reference numeral 164 indicates portions of the extrinsic a-Si layer 160 including the ohmic contact stripes and islands 161 and 165 connected to each other, which are called "extrinsic semiconductor stripes."

The second portions of the conductors and the extrinsic a-Si stripes 164 on the channel areas C as well as the first portion of the photoresist PR are removed.

As shown in FIG. 8, top portions of the projections 154 of the intrinsic semiconductor stripes 151 on the channel areas C may be removed to cause thickness reduction, and the first portions of the photoresist are etched to a predetermined thickness.

In this way, each conductor is divided into a data line 171 and a plurality of pixel electrode lines 175 to be completed, and each extrinsic semiconductor stripe 164 is divided into an ohmic contact stripe 161 and a plurality of ohmic contact islands 165 to be completed.

Figure 9:
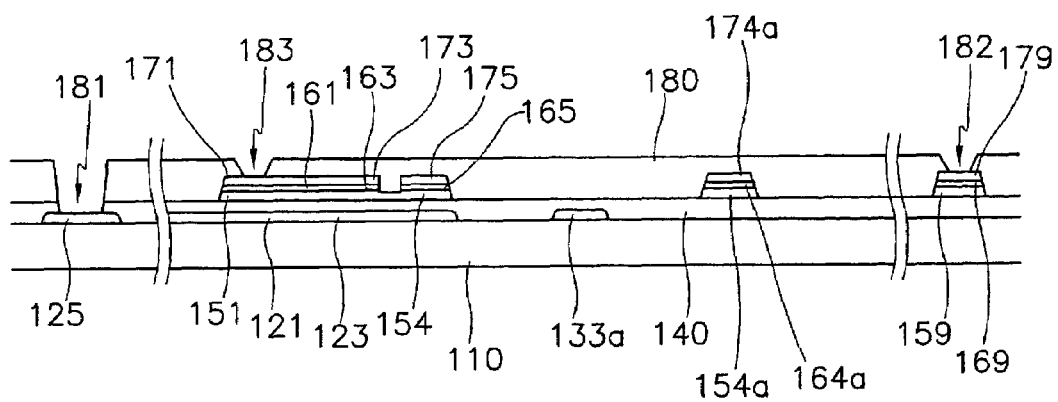

Next, a passivation layer 180 is formed by chemical-vapor-depositing silicon nitride at a temperature in a range of about 250–1500° C., by growing low dielectric material such as a-Si:C:O or a-Si:O:F, by CVD of silicon nitride, or by coating an organic insulating material such as acryl-based material having a good planarization characteristic. Referring to FIG. 9, the passivation layer 180 as well as the gate insulating layer 140 is photo-etched to form a plurality of contact holes 181, 182 and 183.

Finally, as shown in FIGS. 3 and 4, a conductor layer such as an IZO layer with a thickness in a range between about 500 Å and about 1,500 Å is sputtered and photo-etched to form a plurality of redundant data lines 191 and a plurality of contact assistants 95 and 97. The etching of the IZO layer preferably includes wet etching using a Cr etchant of $HNO_3/(NH_4)_2Ce(NO_3)_6/H_2O$, which does not erode Al of the data lines 171 and the pixel electrode lines 172.

This embodiment simplifies the manufacturing process by forming the data lines 171 and the pixel electrode lines 172 as well as the ohmic contacts 161 and 165 and the semiconductor stripes 151 using a single photolithography step.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A thin film transistor array panel comprising:
a gate line and a data line formed on an insulating substrate and intersecting each other;
a plurality of common electrodes separated from the gate line and the data line and making an angle of about 7–23 degrees with the gate line;
a plurality of pixel electrodes separated from the gate line, the data line, and the common electrodes, extending parallel to the common electrodes, and alternately arranged with the common electrodes; and
a thin film transistor connected to the gate line, the data line, and the pixel electrodes,
wherein the distance between a one of the plurality of common electrodes and an adjacent one of the plurality of pixel electrodes is greater than the respective width of the one of the plurality of common electrodes and the adjacent one of the plurality of pixel electrodes.

2. The thin film transistor array panel of claim 1, wherein the common electrodes include first and second electrodes making an angle of about 15–45 degrees with each other.

3. The thin film transistor array panel of claim 1, further comprising a connecting electrode connecting the common electrodes and a common electrode line extending parallel to the gate line and connected to the connecting electrode.

4. The thin film transistor array panel of claim 1, further comprising a pixel electrode line connecting the pixel electrodes and extending parallel to the data lines.

5. A thin film transistor array panel comprising:
an insulating substrate;
a gate line formed on the insulating substrate;
a common electrode line including a plurality of branched common electrodes making an angle of about 7–23 degrees with the gate line;
a gate insulating layer on the gate line;
a semiconductor layer on the gate insulating layer;
a data line formed at least in part on the semiconductor layer;
a pixel electrode line formed at least in part on the semiconductor layer and including a plurality of branched pixel electrodes alternately arranged with the common electrodes; and
a passivation layer formed on the data line and the pixel electrode line,
wherein the distance between the one of the plurality of branched common electrodes and an adjacent one of the plurality of branched pixel electrodes is greater than the respective width of the one of the plurality of branched common electrodes and the adjacent one of the plurality of pixel electrodes.

6. The thin film transistor array panel of claim 5, wherein the common electrodes comprise first and second electrodes making an angle of about 15–45 degrees with each other.

7. The thin film transistor array panel of claim 6, wherein the pixel electrodes comprise third and fourth electrodes extending parallel to the first and the second electrodes, respectively.

8. The thin film transistor array panel of claim 5, further comprising a redundant data line formed on the passivation layer and extending along the data line, the passivation layer having a contact hole for connection between the data line and the redundant data line.

9. The thin film transistor array panel of claim 5, further comprising a contact assistant formed on the passivation layer, the passivation layer having a contact hole exposing a portion of the data line and covered by the contact assistant.

10. The thin film transistor array panel of claim 5, wherein the common electrode line extends substantially parallel to the gate line and further includes a frame connecting the common electrodes.

11. The thin film transistor array panel of claim 5, wherein the pixel electrode line extends substantially parallel to the data line.

12. The thin film transistor array panel of claim 5, further comprising an ohmic contact disposed between the semiconductor layer and the data line and the pixel electrode line.

13. The thin film transistor array panel of claim 12, wherein the semiconductor layer has substantially the same planar shape as the data line and the pixel electrode line and the ohmic contact.

14. A liquid crystal display comprising:
a first substrate;
a gate line and a data line formed on the first substrate and intersecting each other;
a plurality of common electrodes separated from the gate line and the data line and making an angle of about 7–23 degrees with the gate line;
a plurality of pixel electrodes separated from the gate line, the data line, and the common electrodes, extending parallel to the common electrodes, and alternately arranged with the common electrodes;
a thin film transistor connected to the gate line, the data line, and the pixel electrodes;
a second substrate; and
a liquid crystal layer interposed between the first substrate and the second substrate, wherein the distance between a one of the plurality of common electrodes and an adjacent one of the plurality of pixel electrodes is greater than the respective width of the one of the plurality of common electrodes and the adjacent one of the plurality of pixel electrodes.

15. The thin film transistor array panel of claim 1, further comprising a redundant data line formed on the passivation layer and extending along the data line, the passivation layer having a contact hole for connection between the data line and the redundant data line,
  wherein the redundant data line is made of a material selected from the group consisting of indium tin oxide (ITO), indium zinc oxide (IZO), and chromium (Cr).

16. The thin film transistor array panel of claim 8, wherein the redundant data line is made of a material selected from the group consisting of indium tin oxide (ITO), indium zinc oxide (IZO), and chromium (Cr).

17. The thin film transistor array panel of claim 14, further comprising:
  a redundant data line formed on a passivation layer and extending along the data line, the passivation layer having a contact hole for connection between the data line and the redundant data line, the redundant data line and the data line being connected through the contact hole,
  wherein the redundant data line is made of a material selected from the group consisting of indium tin oxide (ITO), indium zinc oxide (IZO), and chromium (Cr).

* * * * *